US008811222B2

(12) United States Patent
Pajukoski et al.

(10) Patent No.: US 8,811,222 B2
(45) Date of Patent: Aug. 19, 2014

(54) METHOD AND APPARATUS FOR CONTROLLING POWER OF MOBILE STATION (71) Applicant: Nokia Siemens Networks Oy, Espoo (FI)

(72) Inventors: Kari P. Pajukoski, Oulu (FI); Klaus I. Pedersen, Aalborg (DK); Esa T. Tiirola, Kempele (FI)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 13/646,915

(22) Filed: Oct. 8, 2012

(65) Prior Publication Data

US 2013/0121184 A1 May 16, 2013

Related U.S. Application Data (62) Division of application No. 13/057,794, filed on Mar. 7, 2011.

(30) Foreign Application Priority Data

Aug. 8, 2008 (WO) ................. PCT/EP2008/060485

(51) Int. Cl.
*H04W 4/00* (2009.01)
*H04W 52/24* (2009.01)
*H04W 72/04* (2009.01)

(52) U.S. Cl.
CPC ........ *H04W 52/242* (2013.01); *H04W 72/0413* (2013.01)
USPC ....................................................... 370/252

(58) Field of Classification Search
None
See application file for complete search history.

(56) References Cited

U.S. PATENT DOCUMENTS

2006/0109923 A1   5/2006   Cai et al. .................. 375/260
2007/0082620 A1*  4/2007   Zhang et al. .............. 455/69

(Continued)

FOREIGN PATENT DOCUMENTS

| CN | 101345970 A | 1/2009 |
| EP | 1 914 907 A1 | 4/2008 |
| WO | WO2008084694 A1 * | 7/2008 |

OTHER PUBLICATIONS

Huawei; "The impact of CA on mobility in LTE-A"; 3GPP TSG RAN WG1 Meeting #55bis, R1-090128, Ljubljana, Slovenia, Jan. 12-16, 2009; whole document (8 pages).

*Primary Examiner* — Marcus R Smith
(74) *Attorney, Agent, or Firm* — Harrington & Smith (57) ABSTRACT

A method, including making one or more measurements at a mobile device of path loss for a transmission between said mobile device and a base station in a first frequency band of a plurality of frequency bands in which the mobile device is configured to make transmissions to said base station; receiving at said mobile device path loss estimate information specifying an estimate of the relationship between said path loss for a transmission between said mobile device and said base station in said first frequency band, and path loss for a transmission between said mobile device and said base station in a second frequency band of said plurality of frequency bands; and determining a transmission power for at least one transmission to said base station in said second frequency band on the basis of at least said one or more measurements and said path loss estimate information.

6 Claims, 3 Drawing Sheets

(56) References Cited

U.S. PATENT DOCUMENTS

| | | |
|---|---|---|
| 2007/0104087 A1 | 5/2007 | Tee et al. ................. 370/208 |
| 2007/0265026 A1 | 11/2007 | You et al. ................. 455/522 |
| 2009/0245191 A1* | 10/2009 | Ball et al. ................. 370/329 |
| 2010/0015967 A1* | 1/2010 | Perets et al. ............. 455/422.1 |
| 2010/0048237 A1* | 2/2010 | Kishiyama et al. ......... 455/522 |
| 2010/0285830 A1* | 11/2010 | Englund et al. ............ 455/522 |
| 2011/0134759 A1* | 6/2011 | Kim et al. .................. 370/242 |

* cited by examiner

METHOD AND APPARATUS FOR CONTROLLING POWER OF MOBILE STATION

The present invention relates to apparatus for facilitating the use of spectrum aggregation in uplink transmissions from a mobile station to a base station. In one embodiment, it relates to a technique for facilitating the use of spectrum aggregation in an orthogonal subcarrier uplink data transmission technique known as Single Carrier-Frequency Domain Multiple Access (SC-FDMA).

A communication device can be understood as a device provided with appropriate communication and control capabilities for enabling use thereof for communication with others parties. The communication may comprise, for example, communication of voice, electronic mail (email), text messages, data, multimedia and so on. A communication device typically enables a user of the device to receive and transmit communication via a communication system and can thus be used for accessing various service applications.

A communication system is a facility which facilitates the communication between two or more entities such as the communication devices, network entities and other nodes. A communication system may be provided by one or more interconnect networks. One or more gateway nodes may be provided for interconnecting various networks of the system. For example, a gateway node is typically provided between an access network and other communication networks, for example a core network and/or a data network.

An appropriate access system allows the communication device to access to the wider communication system. An access to the wider communications system may be provided by means of a fixed line or wireless communication interface, or a combination of these. Communication systems providing wireless access typically enable at least some mobility for the users thereof. Examples of these include wireless communications systems where the access is provided by means of an arrangement of cellular access networks. Other examples of wireless access technologies include different wireless local area networks (WLANs) and satellite based communication systems.

A wireless access system typically operates in accordance with a wireless standard and/or with a set of specifications which set out what the various elements of the system are permitted to do and how that should be achieved. For example, the standard or specification may define if the user, or more precisely user equipment, is provided with a circuit switched bearer or a packet switched bearer, or both. Communication protocols and/or parameters which should be used for the connection are also typically defined. For example, the manner in which communication should be implemented between the user equipment and the elements of the networks and their functions and responsibilities are typically defined by a predefined communication protocol. Such protocols and or parameters further define the frequency spectrum to be used by which part of the communications system, the transmission power to be used etc.

In the cellular systems a network entity in the form of a base station provides a node for communication with mobile devices in one or more cells or sectors. It is noted that in certain systems a base station is called 'Node B'. Typically the operation of a base station apparatus and other apparatus of an access system required for the communication is controlled by a particular control entity. The control entity is typically interconnected with other control entities of the particular communication network. Examples of cellular access systems include Universal Terrestrial Radio Access Networks (UTRAN) and GSM (Global System for Mobile) EDGE (Enhanced Data for GSM Evolution) Radio Access Networks (GERAN).

Fragmentation of the radio spectrum for communication systems has resulted from, for example, the adoption of more spectrally efficient technologies, and the failure of old techniques to use frequencies efficiently. Spectrum aggregation is the collective term for making effective use of multiple and simultaneously available spectral fragments (i.e. sections of the radio spectrum that are vacated or otherwise unused/underutilised) for new or alternative services, and is considered to represent an evolutionary development in the future use and development of the radio spectrum.

In communication systems the uplink, in other words the communication path from the user or user equipment to the access node, which may be a Node B or enhanced Node B (eNB), requires parameters for example power use to be controlled. Current up-link power control schemes are based on a fractional path loss compensation methods, where the user equipment physical uplink shared channel (and also the control channel) transmission power is adjusted based on measurements from the UE experienced path loss between the UE and the access node.

However this is problematic in non-contiguous band communication, in other words where spectrum aggregation is carried out, as the integral path loss is likely to be significantly different and dependent on the spectrum frequency. For example it would be expected that higher frequencies are likely to experience higher pass losses. A possible solution would be to monitor the path loss for each frequency band or spectrum used. However the approach of monitoring all of the uplink frequency bands is problematic in that the method would introduce a significant monitoring and processing burden on the user equipment. For example the user equipment may have to receive and monitor frequency bands or spectrum which the user equipment is not currently receiving during that period and thus consuming more power and or processing capacity therefore reducing the battery lifetime.

It is an aim of the present invention to efficiently facilitate the exploitation of spectrum aggregation in an uplink transmission technique.

The present invention provides a method, comprising: making one or more measurements at a mobile device of path loss for a transmission between said mobile device and a base station in a first frequency band of a plurality of frequency bands in which the mobile device is configured to make transmissions to said base station; receiving at said mobile device path loss estimate information specifying an estimate of the relationship between said path loss for a transmission between said mobile device and said base station in said first frequency band, and path loss for a transmission between said mobile device and said base station in a second frequency band of said plurality of frequency bands; and determining a transmission power for at least one transmission to said base station in said second frequency band on the basis of at least said one or more measurements and said path loss estimate information.

The path loss estimate information is preferably received from said base station as part of radio resource control signalling, or part of cell-specific system information.

According to a second aspect of the invention there is provided a method comprising: sending to a mobile device path loss estimate information specifying an estimate of the relationship between path loss for a transmission between said mobile device and a base station in a first frequency band of a plurality of frequency bands in which said mobile device is configured to make transmissions to said base station, and path loss for a transmission between said mobile device and said base station in a second frequency band of said plurality of frequency bands.

The path loss estimate information is sent to said base station as part of radio resource control signalling, or part of cell-specific system information The first frequency band is preferably specified to be the same for any link between any mobile device and said base station.

The base station is preferably part of a network of base stations, and said first frequency band is preferably specified to be the same for any link between said mobile device and any of said network of base stations.

The at least one transmission is preferably a multi-carrier transmission at a series of orthogonal frequencies within said second frequency band.

According to a third aspect of the invention there is provided apparatus, configured to: make one or more measurements at a mobile device of path loss for a transmission between said mobile device and a base station in a first frequency band of a plurality of frequency bands in which the mobile device is configured to make transmissions to said base station; receive at said mobile device path loss estimate information specifying an estimate of the relationship between said path loss for a transmission between said mobile device and said base station in said first frequency band, and path loss for a transmission between said mobile device and said base station in a second frequency band of said plurality of frequency bands; and determine a transmission power for at least one transmission to said base station in said second frequency band on the basis of at least said one or more measurements and said path loss estimate information.

The apparatus may be configured to receive said path loss estimate information from said base station as part of radio resource control signalling, or part of cell-specific system information.

According to a fourth aspect of the invention there is provided apparatus configured to: send to a mobile device path loss estimate information specifying an estimate of the relationship between path loss for a transmission between said mobile device and a base station in a first frequency band of a plurality of frequency bands in which said mobile device is configured to make transmissions to said base station, and path loss for a transmission between said mobile device and said base station in a second frequency band of said plurality of frequency bands.

The path loss estimate information is preferably sent to said base station as part of radio resource control signalling, or part of cell-specific system information The first frequency band is preferably specified to be the same for any link between any mobile device and said base station.

The base station is preferably part of a network of base stations, and said first frequency band is specified to be the same for any link between said mobile device and any of said network of base stations.

The at least one transmission is preferably a multi-carrier transmission at a series of orthogonal frequencies within said second frequency band.

A computer program product comprising program code means which when loaded into a computer controls the computer to preferably perform a method described above.

According to a fifth aspect of the invention there is provided apparatus, configured to: determine a first frequency band from a plurality of frequency bands for transmission between the apparatus and a further apparatus; measure for the first frequency band a path loss value between the further apparatus and the apparatus; determine a path loss difference value for each of the remainder of the plurality of frequency bands; and determine a transmission power for each of the frequency bands dependent on on the path loss value measured, wherein the transmission power for the remainder of the plurality of the frequency bands is further dependent on the associated path loss difference value.

According to a sixth aspect of the invention there is provided apparatus, configured to: transmit to at least one further apparatus an indicator identifying a first frequency band from a plurality of frequency bands for transmission between the apparatus and the at least one further apparatus; and transmit to the at least one further apparatus a path loss difference value for each of a remainder of the plurality of frequency bands.

The apparatus is preferably a user equipment and the further apparatus is preferably an access node.

The apparatus is preferably an access node and the further apparatus is preferably a user equipment.

According to a seventh aspect of the invention there is provided a method comprising: determining a first frequency band from a plurality of frequency bands for transmission between an apparatus and a further apparatus; measuring for the first frequency band a path loss value between the further apparatus and the apparatus; determining a path loss difference value for each of the remainder of the plurality of frequency bands; and determining a transmission power for each of the frequency bands dependent on the path loss value measured, wherein the transmission power for the remainder of the plurality of the frequency bands is further dependent on the associated path loss difference value.

According to an eighth aspect of the invention there is provided a method comprising: transmitting from an apparatus to at least one further apparatus an indicator identifying a first frequency band from a plurality of frequency bands for transmission between the apparatus and the at least one further apparatus; and transmitting from the apparatus to the at least one further apparatus a path loss difference value for each of a remainder of the plurality of frequency bands.

A computer program product comprising program code means which when loaded into a computer controls the computer may perform a method as featured above.

An embodiment of the invention is described in detail hereunder, by way of example only, with reference to the accompanying drawings, in which.

In the following certain specific embodiments are explained with reference to communication system standards known as long-term evolution (LTE) an attempt to improve on the communication systems known as Universal Mobile Telecommunication Systems (UMTS). However it would be appreciated by persons skilled in the art that other embodiments of the invention may be applied to other communications standards where control of the uplink communications power transmitted is desired and where the uplink communication is distributed over multiple frequency bands which are not necessarily contiguous.

Figure 1:
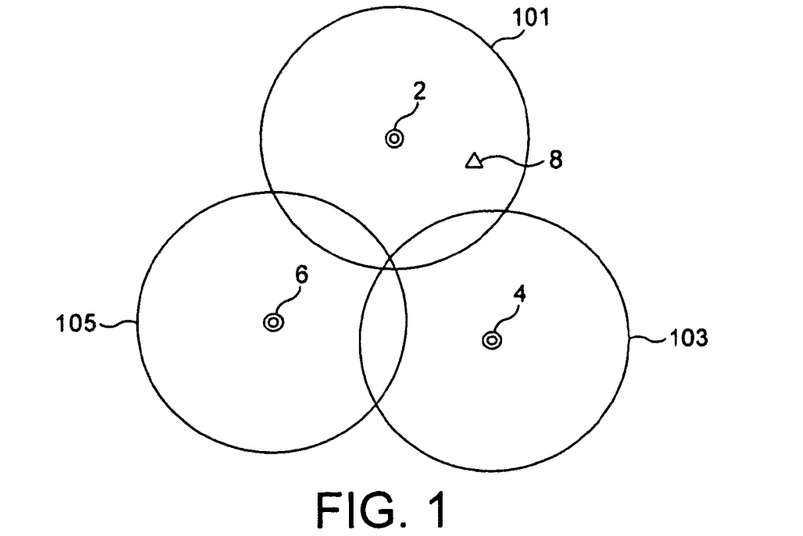
FIG. 1 illustrates a radio network within which embodiments of the invention may be implemented including a number of cells each served by a respective base station (eNodeB)
Figure 2:
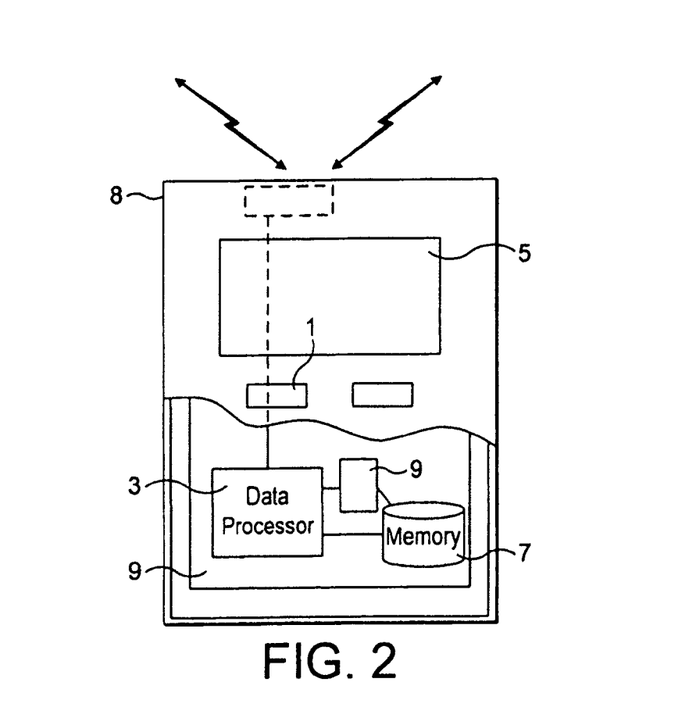
FIG. 2 illustrates an apparatus suitable for implementing embodiments of the invention.
Figure 3:
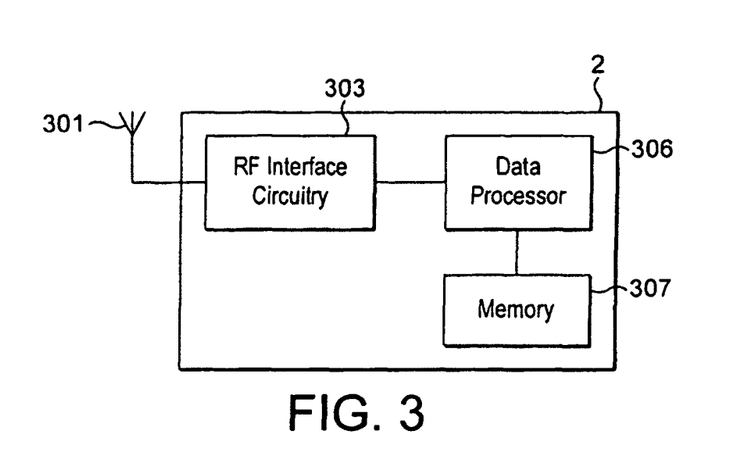
FIG. 3 illustrates an access node or base station of the radio network shown in FIG. 1 in further detail.

FIGS. 1, 2 and 3 show respectively the communication system or network, an apparatus for communication within the network, and an access node of the communications network.

FIG. 1 shows a communications system or network comprising a first access node 2 with a first coverage area 101, a second access node 4 with a second coverage area 103 and a third access node 105 with a third coverage area. Furthermore FIG. 1 shows an exemplary apparatus 8 which is configured to communicate with at least one of the access nodes 2, 4, 6. These coverage areas may also be known as cellular coverage areas or cells where the access network is a cellular communications network.

FIG. 2 shows a schematic partially sectioned view of an apparatus 8 for example an user equipment, also known as a mobile device, 8 that may be used for accessing the access nodes and thus the communication system via a wireless interface. The user equipment (UE) 8 may be used for various tasks such as making and receiving phone calls, for receiving and sending data from and to a data network and for experiencing, for example, multimedia or other content.

The apparatus 8 may in embodiments of the invention be any device capable of at least sending or receiving radio signals. Non-limiting examples include a mobile station (MS), a portable computer provided with a wireless interface card or other wireless interface facility, personal data assistant (PDA) provided with wireless communication capabilities, or any combinations of these or the like. The mobile device may communicate via an appropriate radio interface arrangement of the mobile device. The interface arrangement may be provided for example by means of a radio part 7 and associated antenna arrangement. The antenna arrangement may be arranged internally or externally to the apparatus 8.

The apparatus 8 may be provided with at least one data processing entity 3 and at least one memory or data storage entity 7 for use in tasks it is designed to perform. The data processor 3 and memory 7 may be provided on an appropriate circuit board 9 and/or in chipsets.

The user may control the operation of the apparatus 8 by means of a suitable user interface such as key pad 1, voice commands, touch sensitive screen or pad, combinations thereof or the like. A display 5, a speaker and a microphone may also be provided. Furthermore, the apparatus 8 may comprise appropriate connectors (either wired or wireless) to other devices and/or for connecting external accessories, for example hands-free equipment, thereto.

As can be seen with respect to FIG. 2, the apparatus 8 may be configured to communicate with at least one of a number of access nodes 2, 4, 6, for example when it is located in the coverage area 101 of a first access node 2 the apparatus is configured to be able to communicate to the first access node 2, when in the coverage area 103 of a second node 4 the apparatus may be able to communicate with the second access node 4, and when in the coverage area 105 of the third access node 6 the apparatus may be able to communicate with the third access node 6.

FIG. 3 shows an example of the first access node, which in this embodiment of the invention is represented by an evolved node B (eNB) according to an embodiment of the present invention. The eNB 2 comprises a radio frequency antenna 301 configured to receive and transmit radio frequency signals, radio frequency interface circuitry 303 configured to interface the radio frequency signals received and transmitted by the antenna 301 and the data processor 167. The radio frequency interface circuitry may also be known as a transceiver. The access node (evolved node B) 2 may also comprise a data processor configured to process signals from the radio frequency interface circuitry 303, control the radio frequency interface circuitry 303 to generate suitable RF signals to communicate information to the apparatus 8 via the wireless communications link. The access node further comprises a memory 307 for storing data, parameters and instructions for use by the data processor 305.

It would be appreciated that both the apparatus 8 and access node 2 shown in FIGS. 2 and 3 respectively and described above may comprise further elements which are not directly involved with the embodiments of the invention described hereafter.

Although the following describes embodiments of the invention using evolved node B (eNB) apparatus operating within an EUTRAN, further embodiments of the invention may be performed in any base station, node B and evolved node B suitable for communicating with a user equipment capable of communication in that access network, and further comprising data processing and storage capacity suitable for carrying the operations as described below.

Figure 4:
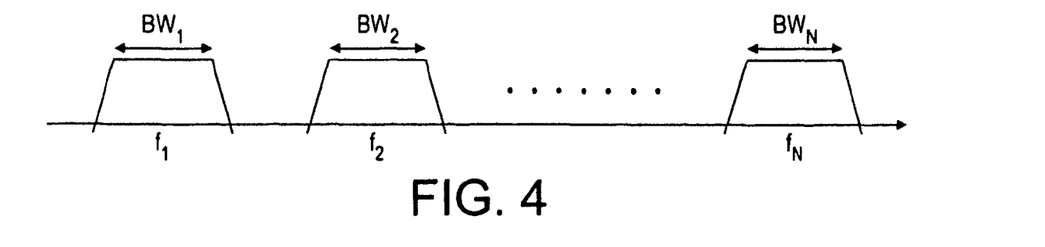
FIG. 4 illustrates the division of a part of a frequency band into a group of orthogonal sub-carriers for a SC-FDMA uplink transmission.

According to an embodiment of the invention, a radio network of the kind illustrated in FIG. 1 (including the plurality of cells served by the respective access nodes (eNodeBs) 2, 4, 6) is designed to support carrier aggregation of N non-contiguous different frequency bands as shown in FIG. 4. The frequency bands may have different or same bandwidths, and arbitrary centre frequencies. An example configuration could be N=2, in other word two separate channels, where a first channel has a 10 MHz bandwidth below 1 GHz and a second channel with a 20 MHz bandwidth above 20 MHz. In this example the access node 2 data processor 305 may dynamically schedule the apparatus 8 within the coverage area 101 (in other words under its control) to use these N=2 frequency bands.

Figure 5:
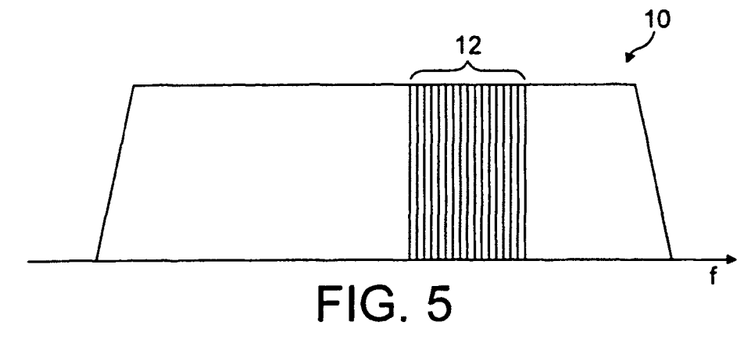
FIG. 5 illustrates an example of spectrum fragmentation.

In the case of an SC-FDMA uplink transmission from the user equipment (UE) 8 to the eNodeB 2, the eNode-B 2 data processor 305 may select a group of orthogonal sub-carriers in one of the two frequency bands for the transmission of data from the UE 8 to the e-Node B 2, and inform the UE 2 accordingly by means of a physical down-link control channel (PDCCH). The division of a section of a frequency band 10 into a localised group 12 of orthogonal sub-carriers is illustrated in FIG. 5.

The SC-FDMA transmission includes (i) creating a representation of a series of data symbols (which data symbols are themselves created from the original data bits) in the time-domain; (ii) converting the time-domain representation into a frequency-domain representation using a discrete Fourier transform (DFT) to create a group of DFT bins at a series of orthogonal frequencies, with each bin representing one sub-carrier with amplitude and phase held constant for the transmission symbol time; and (iii) then applying an Inverse Fast Fourier Transformation (IFFT) function to create a series of samples that are used to generate a multi-carrier signal. This last step (iii) is the mathematical equivalent of generating each sub-carrier signal by a separate transmission chain hardware block, and summing the output of such blocks for sending the resulting signal over the wireless interface. At the receiving end (eNodeB), the received signal is first demodulated and amplified, and then treated by a fast Fourier transformation function (FFT) which converts the time signal back into the frequency domain. The resulting amplitude diagram is fed to an Inverse Fast Fourier Transformation (IFFT) function, and the resulting time domain signal is then fed to a single detector block which recreates the original bits.

The transmission protocol may further specify that at any one time-instant the UE 2 can only be scheduled for a transmission in a single one of the N=2 frequency bands. According to one variation, the uplink (UL) data for transmission from the UE 2 to the eNode B 8 is divided up and allocated to different ones of the N=2 non-contiguous frequency bands before channel coding. The UE 2 decodes PDCCH from multiple downlink (DL) subbands to determine which respective group of orthogonal sub-carriers to use in each of the N=2 frequency bands and transmits the uplink (UL) data accordingly. The transmission of the UL data allocated to one of the N=2 frequency bands is independent of the simultaneous transmission of the UL data allocated to the other of the N=2 frequency bands; for example, the two groups of data are subject to respective discrete Fourier transform (DFT) operations. Hybrid automatic repeat request (HARD) operations (i.e. the provision of acknowledgement (ACK) or non-acknowledgment (NACK) feedback messages to the UE2) are carried out on a frequency-band specific basis.

With respect to FIG. 6 the operation of controlling the transmission power of the SC-FDMA uplink transmissions is further described below.

The apparatus 8 data processor firstly determines one of the N=2 frequency bands as being a primary band. The primary band may be specific for each cell or access node (eNB) 2, or specific to the apparatus (UE) 8. In a first embodiment of the invention the access node transmits the number or the indicator of the primary band using the Radio Resource Control (RRC) signalling information. However any other suitable signalling pathway may be used to transmit this information to the apparatus from the access network. In some embodiments of the invention the apparatus 8 determines the primary band and indicates this information to the access node as part of an uplink data signal. The operation of determining the primary band is shown in FIG. 6 by step 601.

The apparatus 8 having determined the primary band, measures only the integral path loss between the apparatus 8 and the serving access node 8 for the primary band.

The integral path loss may be determined or measured for the primary band (PL_primary) between the apparatus 8 and the access node 2 by the apparatus 8. This may be achieved for example by the apparatus 8 monitoring a reference signal which has a known or predetermined signal strength transmitted from the access node 2. The difference between the received reference signal strength and the reference signal strength calculated at the apparatus data processor 3 thus may define a path loss in the down link. The reference signal may not in embodiments of the invention have the same frequency as the primary band or be transmitted at the same time as the primary band is transmitted. However where the reference signal is transmitted either at a similar time or frequency to the primary band it is understood that the path loss for the reference signal from the access node 2 to the apparatus 8 will be a good estimate of the path loss for the primary band from the apparatus to the access node.

In other embodiments of the invention the primary integral path loss (PL_primary) may be determined or measured within the access node 2 data processor 305 from a reference signal being transmitted from the apparatus 8 to the access node 2. The access node 2 data processor may then control the radio frequency interface circuitry to 303 to transmit the integral path loss back to the apparatus.

Figure 6:
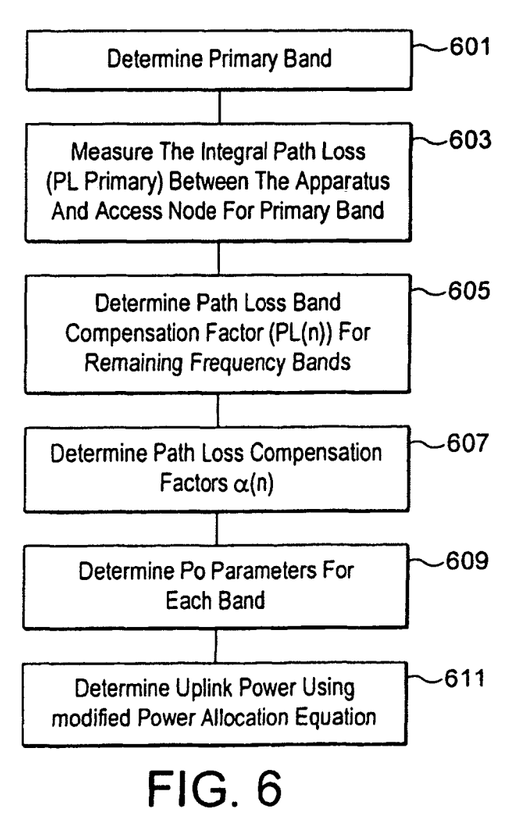
FIG. 6, shows an example of the operation of an embodiment of the invention.

The operation of determining the primary band integral path loss is shown in FIG. 6 by step 603.

The apparatus 8 data processor 3 furthermore determines the path loss band compensation factors for the remaining frequency bands (PL(n)).

In embodiments the path loss band compensation factors may be passed to the apparatus from the access node 2.

The access node 2 memory 307 may for example store a look up table of the expected path loss differences between frequency bands used by the access node 2. The look up table or data is read by the processor 305 and then passed to the apparatus 8 via the wireless link using the RRC.

These expected path loss differences may be difference values measured or determined based on the environment within which the access node 2 operates within and the coverage area 101 of the access node 2. As such these difference values may be determined accurately during the radio network planning phase given the large amount of detailed theoretical frequency dependent path loss models and the published propagation measurements in the public literature.

The access node 2 processor 305 may in some embodiments of the invention determine the path loss difference PL(n) using approximations of the path loss models. In other embodiments of the invention the access node 2 may monitoring 'centrally' the difference in signal strength between various bands and use these monitored differences to determine the path loss difference factors.

The determination of the path loss difference values (the path loss band compensation factor) is shown in FIG. 6 by step 605.

The apparatus 8 data processor may further determine the path loss compensation factor α(n) by receiving the required values from the access node 2. The path loss compensation factor α(n) is a band dependent version of the path loss compensation factor known in the art and may be determined as a 3 bit cell and band specific parameter and provided by higher access layers.

The determination of the band dependent path loss compensation factor α(n) is shown in FIG. 6 by step 607.

The apparatus 8 data processor may further determine the band dependent parameter $P_{o\_PUSCH}(n)$ (for the uplink shared channel—and $P_{o\_PUCCH}(n)$ for the uplink control channel) by receiving the required values from the access node 2. The parameter is a band dependent version of the parameter used in the determination of the uplink power in the art and may be composed of the sum of a 8-bit cell specific nominal component signalled from higher access layers and an apparatus specific component.

The determination of the band dependent band dependent parameter $P_{o\_PUSCH}(n)$ is shown in FIG. 6 by step 609.

The apparatus 8 data processor may then determine the transmission power for an uplink SC-FDMA transmission on a physical uplink shared channel (PUSCH) in a frequency band other than the primary band is controlled according to the following formula. This formula is a development of a formula specified in 3GPP TS 36.213 for a fractional path loss compensation method.

$$P_{PUSCH}(i) = \min\{P_{MAX}, 10\log_{10}(M_{PUSCH}(i)) + P_{O\_PUSCH}(j,n) + \alpha(n) \cdot (PL\_primary + PL(n)) + \Delta_{TF}(TF(i)) + f(i)\} \quad \text{[dBm]}$$

where, $P_{MAX}$ is the maximum allowed power that depends on the UE power class $M_{PUSCH}(i)$ is the size of the PUSCH resource assignment expressed in number of resource blocks valid for subframe i.

$P_{O\_PUSCH}(j, n)$ is the parameter discussed above and composed of the sum of a 8-bit cell specific nominal component $P_{O\_NOMINAL\_PUSCH}(j)$ signalled from higher layers for j=0 and 1 in the range of [−126,24] dBm with 1 dB resolution and a 4-bit UE specific component $P_{O\_UE\_PUSCH}(j)$ configured by RRC for j=0 and 1 in the range of [−8, 7] dB with 1 dB resolution. For PUSCH (re)transmissions corresponding to a configured scheduling grant then j=0 and for PUSCH (re)transmissions corresponding to a received PDCCH with DCI format 0 associated with a new packet transmission then j=1. This Po parameter is configured independently for each of the N frequency bands.

$\alpha(n) \in \{0, 0.4, 0.5, 0.6, 0.7, 0.8, 0.9, 1\}$ is as discussed above a 3-bit cell specific parameter provided by higher layers. This parameter is also configured independently for each of the N frequency bands.

PL_primary is as discussed above the downlink pathloss estimate for the primary frequency band, which estimate is based on measurements made at the UE PL(n) is as discussed above a parameter expressing the expected path loss between the primary frequency band (denoted PL_primary) and the frequency band #n for which the transmission(s) are scheduled. The value of PL(n) is signalled from the eNode-B to the UE.

$\Delta_{TF}(TF(i)) = 10 \log_{10}(2^{MPR \cdot K_s} - 1)$ for $K_s = 1.25$ and 0 for $K_s = 0$ where $K_S$ is a cell specific parameter given by RRC TF(i) is the PUSCH transport format valid for subframe i MPR=modulation x coding rate=$N_{INFO}/N_{RE}$ where $N_{INFO}$ are the number of information bits and $N_{RE}$ is the number of resource elements determined from TF(i) and $M_{PUSCH}(i)$ for subframe i $\delta_{PUSCH}$ is a UE specific correction value, also referred to as a TPC command and is included in PDCCH with DCI format 0 or jointly coded with other TPC commands in PDCCH with DCI format 3/3A. The current PUSCH power control adjustment state is given by f(i) which is defined by:

$f(i) = f(i-1) + \delta_{PUSCH}(i - K_{PUSCH})$ if f(*) represents accumulation where f(0)=0 and $K_{PUSCH}$=4

The UE attempts to decode a PDCCH of DCI format 0 and a PDCCH of DCI format 3/3A in every subframe except when in DRX $\delta_{PUSCH}$=0 dB for a subframe where no TPC command is decoded or where DRX occurs.

The $\delta_{PUSCH}$ dB accumulated values signalled on PDCCH with DCI format 0 are [−1, 0, 1, 3].

The $\delta_{PUSCH}$ dB accumulated values signalled on PDCCH with DCI format 3/3A are one of [−1, 1] or [−1, 0, 1, 3] as semi-statically configured by higher layers.

If UE has reached maximum power, positive TPC commands are not accumulated

If UE has reached minimum power, negative TPC commands shall not be accumulated

UE shall reset accumulation
  at cell-change
  when entering/leaving RRC active state
  when an absolute TPC command is received
  when $P_{O\_UE\_PUSCH}(j)$ is received
  when the UE (re)synchronizes $f(i) = \delta_{PUSCH}(i - K_{PUSCH})$ if f(*) represents current absolute value where $\delta_{PUSCH}(i - K_{PUSCH})$ was signalled on PDCCH with DCI format 0 on subframe $i - K_{PUSCH}$ where $K_{PUSCH}$=4

The $\delta_{PUSCH}$ dB absolute values signalled on PDCCH with DCI format 0 are [−4, −1, 1, 4].

f(i)=f(i−1) for a subframe where no PDCCH with DCI format 0 is decoded or where DRX occurs.

f(*) type (accumulation or current absolute) is a UE specific parameter that is given by RRC.

Where respective groups of data are allocated for simultaneous SC-FDMA transmissions from the same UE 2 in respective different ones of the N frequency bands, the transmission power for each of the frequency bands is controlled as described above. For a transmission in the frequency band designated as the primary frequency band, PL(n) is, for course, set to zero. Controlling the transmission power independently for each of the N-frequency bands can have the advantage of reducing peak-to-average power ratio (PAPR).

In another embodiment, a similar power control scheme is applied to transmissions on the uplink control channel (PUCCH), i.e. the path loss compensation factor and Po_pucch are also specified separately for each frequency band, and transmission power is also determined based on an estimate of the path loss difference between the primary frequency band and the frequency band in which the PUCCH transmission is to be made.

The above-described power control technique makes it possible to efficiently control the power of transmissions in any one of a plurality of frequency bands, without the UE 2 having to explicitly measure the integral path loss for each and every one of the plurality of frequency bands (which would typically involve receiving signals from on each and every one of the plurality of frequency bands). This is particularly significant for non-contiguous bands with relative large frequency separation, where the integral path loss is likely to be significantly different for each band. The latter is the case due to the frequency dependent radio propagation path loss (i.e. higher path loss for higher frequencies), and due to potential differences in eNode-B and UE antenna gains for the different frequency bands.

Also, specifying independent parameters Po and α for each of the plurality of frequency bands serves to facilitate effective power control even in the case of non-contiguous frequency bands with relatively large frequency separation, where the path loss distribution is likely to be different for each band.

The above-described technique is considered to be of particular interest in, for example, the development of LTE-A (Long Term Evolution-Advanced).

Appropriately adapted computer program code product may be used for implementing the above-described functions of the UE 2 and the eNodeB 8. The program code product for providing the operation may be stored on and provided by means of a carrier medium such as a carrier disc, card or tape. Another possibility is to download the program code product via a data network.

The applicant draws attention to the fact that the present invention may include any feature or combination of features disclosed herein either implicitly or explicitly or any generalisation thereof, without limitation to the scope of any definitions set out above.

The above described operations may require data processing in the various entities. The data processing may be provided by means of one or more data processors. Similarly various entities described in the above embodiments may be implemented within a single or a plurality of data processing entities and/or data processors. Appropriately adapted computer program code product may be used for implementing the embodiments, when loaded to a computer. The program code product for providing the operation may be stored on and provided by means of a carrier medium such as a carrier disc, card or tape. A possibility is to download the program code product via a data network. Implementation may be provided with appropriate software in a server.

For example the embodiments of the invention may be implemented as a chipset, in other words a series of integrated circuits communicating among each other. The chipset may comprise microprocessors arranged to run code, application specific integrated circuits (ASICs), or programmable digital signal processors for performing the operations described above.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Also, in view of the foregoing description it will be evident to a person skilled in the art that various modifications of the described embodiments may be made within the scope of the invention.

The invention claimed is:

1. A mobile device, comprising:
one or more processors; and
one or more memories including computer program code,
the one or more memories and the computer program code configured, with the one, or more processors, to cause the mobile device to perform at least the following:
determine a first frequency band from a plurality of frequency bands for transmission between the mobile device and a base station, the mobile device and the base station being in operable communication with each other within a first area;
measure at the mobile device for the first frequency band a path loss value for the transmission between the base station and the mobile device;
receive at the mobile device a path loss difference value between the path loss value for the first frequency band and a path loss value for at least one from the remainder of the plurality of frequency bands, wherein the path loss difference value is received from the base station; and
determine a transmission power to the base station for the at least one from the remainder of the plurality of frequency bands dependent on the path loss value measured and the path loss difference value.

2. The mobile device as claimed in claim 1, wherein the mobile device is a user equipment.

3. A base station, comprising:
one or more processors; and
one or more memories including computer program code,
the one or more memories and the computer program code configured, with the one or more processors, to cause the base station to perform at least the following:
transmit to at least one mobile device in communication with the base station within a first area an indicator identifying a first frequency band from a plurality of frequency bands for transmission between the base station and the at least one mobile device; and
transmit to the at least one mobile device a path loss difference value between a path loss value for the first frequency band and a path loss value for at least one from a remainder of the plurality of frequency bands.

4. A method comprising:
determining a first frequency band from a plurality of frequency bands for transmission between a mobile device and a base station in communication with the mobile device within a first area;
measuring at the mobile device for the first frequency band a path loss value for the transmission between the base station and the mobile device;
receiving at the mobile device a path loss difference value between the path loss value for the first frequency band and a path loss value for at least one from the remainder of the plurality of frequency bands, wherein the path loss difference value is received from the base station; and
determining a transmission power to the base station for the at least one from the remainder of the plurality of frequency bands dependent on the path loss value measured and the path loss difference value.

5. A non-transitory computer readable medium comprising program code which when loaded into a computer controls the computer to perform a method according to claim 4.

6. A method comprising:
transmitting from a base station to at least one mobile device in communication with the base station within a first area an indicator identifying a first frequency band from a plurality of frequency bands for transmission between the base station and the at least one mobile device; and
transmitting from the base station to the at least one mobile device a path loss difference value between a path loss value for the first frequency band and a path loss value for at least one from a remainder of the plurality of frequency bands.

* * * * *